United States Patent [19]
Fordeck

[11] 4,397,593
[45] Aug. 9, 1983

[54] TOOL FOR CUTTING OPENINGS

[76] Inventor: William A. Fordeck, 1025 Ridgewood Dr. #14, Fort Wayne, Ind. 46805

[21] Appl. No.: 230,377

[22] Filed: Feb. 2, 1981

[51] Int. Cl.³ .............................................. B23C 1/20
[52] U.S. Cl. ..................................... 409/179; 30/300; 408/26; 409/144; 409/178; 409/199
[58] Field of Search ................... 29/26 A; 408/22, 24, 408/25, 26, 29; 409/199, 178, 179, 144; 30/300

[56] References Cited

U.S. PATENT DOCUMENTS

| | | | |
|---|---|---|---|
| 1,401,455 | 12/1921 | Basmaison | 408/22 |
| 1,510,372 | 9/1924 | Ambrosio | 144/1 E |
| 2,134,069 | 10/1938 | Zimmerman | 30/300 X |
| 2,462,997 | 3/1949 | Roush | 409/144 |
| 3,114,294 | 12/1963 | Wright | 409/144 X |
| 3,146,675 | 9/1964 | Anderson | 409/179 |
| 3,153,369 | 10/1964 | Strohecker et al. | 409/144 X |
| 3,162,091 | 12/1964 | Keller | 409/144 |
| 3,164,063 | 1/1965 | Sherman | 409/144 |
| 3,249,017 | 5/1966 | Strohecker et al. | 409/144 X |
| 3,263,570 | 8/1966 | Heffron | 409/144 |
| 3,540,347 | 11/1970 | Randall | 409/144 X |
| 3,884,280 | 5/1975 | Chailer | 408/22 X |

Primary Examiner—William R. Briggs
Assistant Examiner—Steven B. Katz
Attorney, Agent, or Firm—George A. Gust

[57] ABSTRACT

The invention is a tool for use with a machine tool such as a drill press or the like for cutting circular openings or segments thereof in sheet material. The device includes a pilot drill and an articulated gear train operatively coupling a tool holder and cutting tool to a pilot drill. The articulated gear train is received within a housing which is rotatable about the axis of the pilot drill to enable movement of the cutting tool along an arcuate path about the axis of the pilot drill.

11 Claims, 8 Drawing Figures

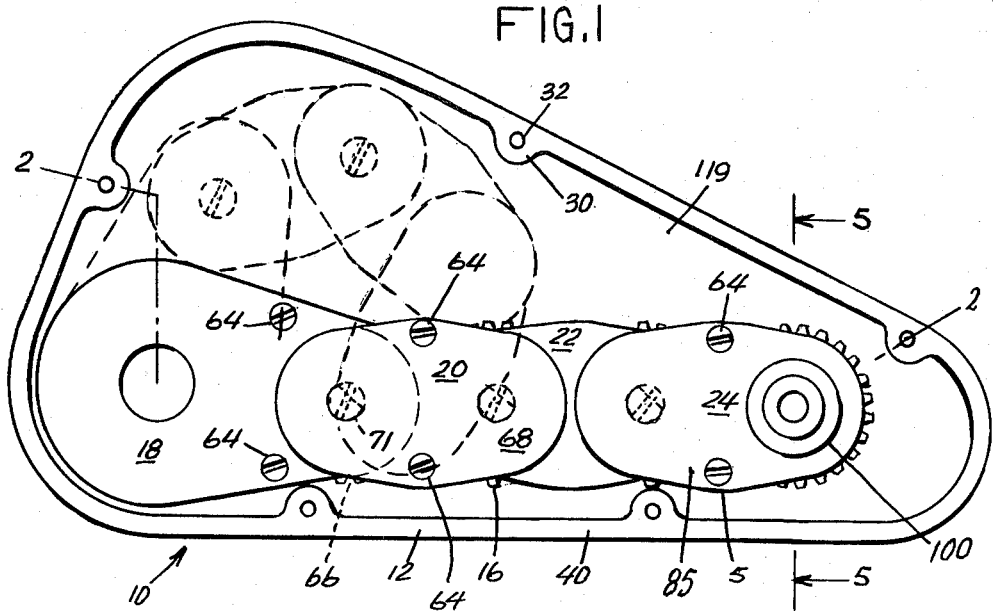
FIG.1
FIG.2a
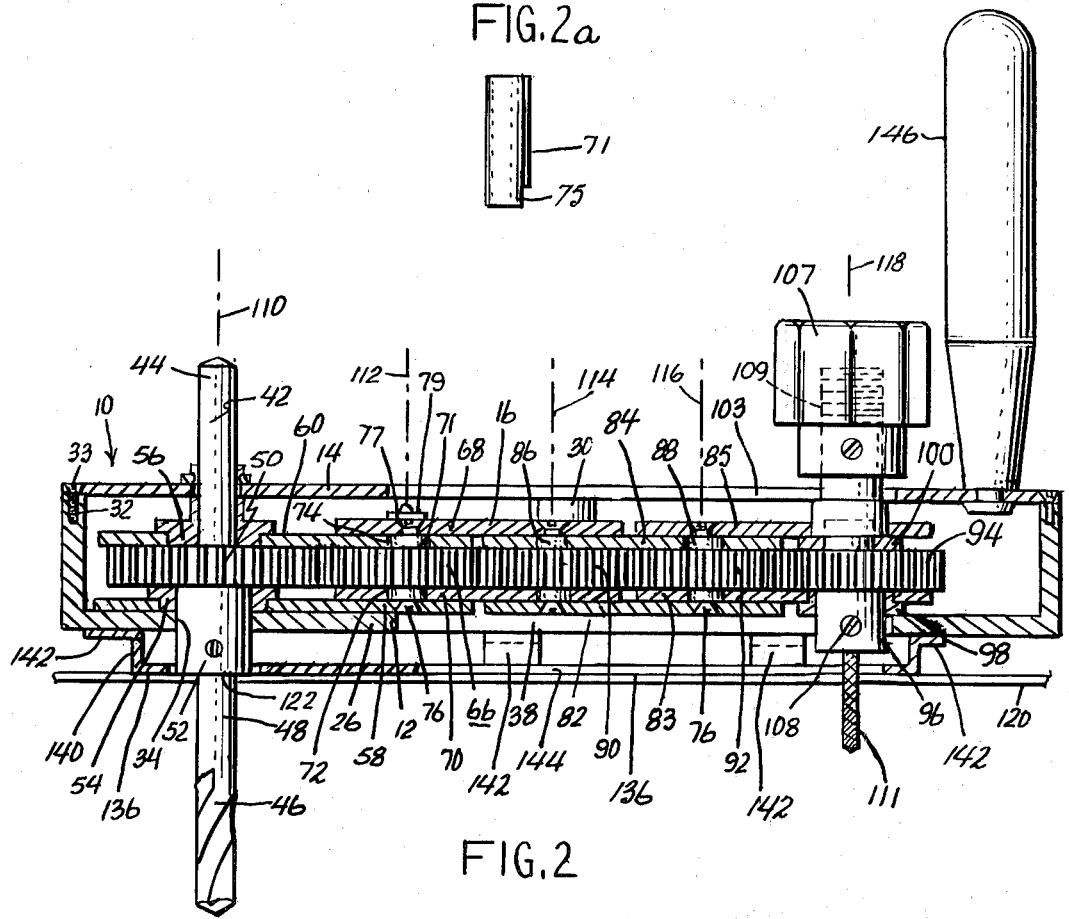
FIG.2

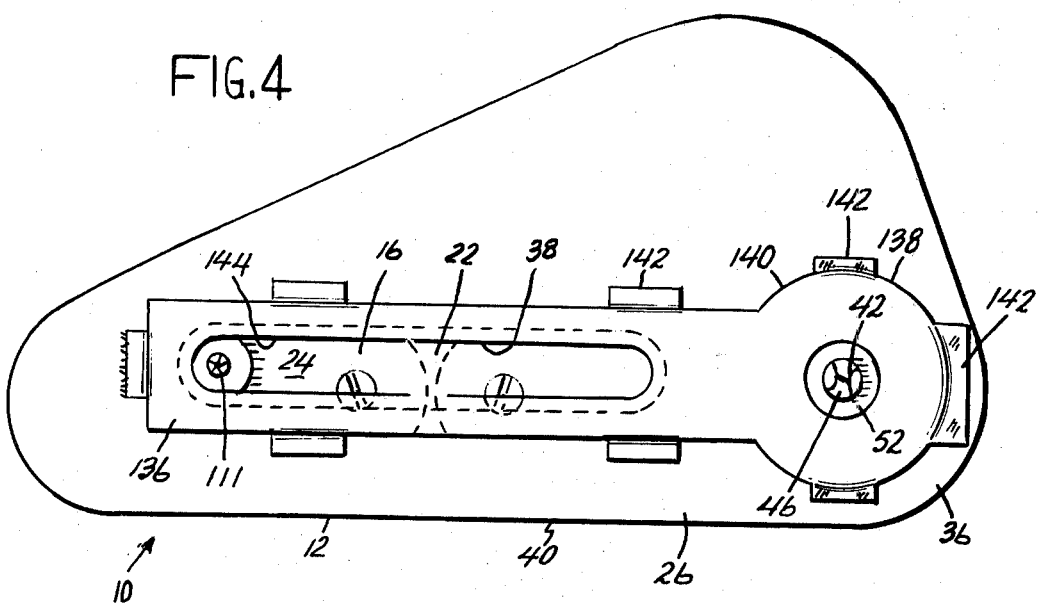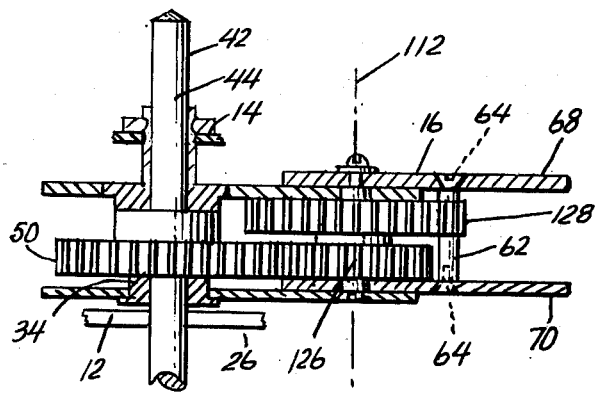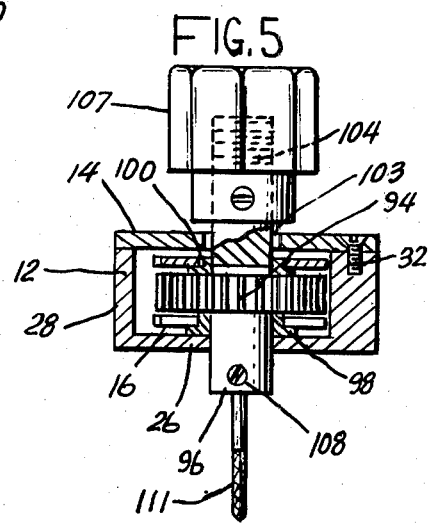

TOOL FOR CUTTING OPENINGS

BACKGROUND OF THE INVENTION

1. Field of the Invention

The present invention relates to machine tools for cutting circles and more particularly such a tool adapted for use with a drill press, electric hand drill or similar machine for cutting circles or segments of circles of selected diameter.

2. Description of the Prior Art

Various devices have been taught in the prior art for cutting circles in a workpiece. Typical of such prior art devices are those adapted for use with a drill press or a milling machine and in which a stationary cutting tool is fixedly mounted to a rotating frame at a selected radius from the axis of rotation of the drill press or the like. Such devices have the disadvantage of being unbalanced and, accordingly, limited to slow speed operation. Another type of such device, disclosed in U.S. Pat. No. 3,263,570 to Heffron et al., discloses an attachment for machine tools which utilizes a geared connection between the machine tool output shaft and the cutting tool. The cutting tool is rotated about its own axis and this axis is, in turn, rotated about an axis spaced at a selected distance from the axis of the machine tool to permit cutting arcuate slots or circular holes. This device, is adapted for use as an attachment with a stationary milling machine. It does not have its own pilot center, is not portable for use with a hand drill, cannot be used in cutting radial slots, and is limited in use to a small radius variation depending upon the diameter of the floating idler gear.

SUMMARY OF THE INVENTION

Broadly, the present invention is an attachment for use with a machine tool such as a drill press which includes a centering device such as a pilot drill which is received in the chuck of a drill press and to which is fixedly coupled a drive gear of selected pitch diameter. An articulated gear train including a plurality of sections is operatively coupled to the drive gear and includes a cutting tool holder in its distal section or link. A housing is provided and the device includes a clamping mechanism which permits the cutting tool to be secured at a selected radial distance from the pilot drill. The entire housing is rotated about the pilot drill to effect the cutting of an arcuate slot or circular hole.

In a specific embodiment of the invention, the housing is further provided with one or more surfaces for guiding the tool on the surface of the workpiece. In another specific embodiment of the invention, compound gearing is utilized to permit variation of the speed of the cutting tool over a wide range.

It is therefore an object of the invention to provide an improved hole cutting attachment for use with a machine tool.

Another object of the invention is to provide such a device which permits the cutting of circular holes and arcuate slots over a wide range of radii with an infinite number of graduations.

Still another object of the invention is to provide such a device which permits effective control of the relative speed which the tool cuts with respect to the output speed of the machine tool with which the device is used.

Yet another object of the invention is to provide such a device which is balanced in its operation to permit operation of cutting tools at high speeds.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a top plan view of the device of the present invention with the top cover thereof removed;

FIG. 2 is a cross-sectional view of the device of the present invention taken generally along section line 2—2 of FIG. 1;

FIG. 2a is a side view of one of the gear axles;

FIG. 3 is a fragmentary sectional view showing a modified embodiment of the device, utilizing compound gearing;

FIG. 4 is a bottom plan view of the device of the present invention;

FIG. 5 is a fragmentary sectional view taken along section line 5—5 of FIG. 1;

DESCRIPTION OF THE PREFERRED EMBODIMENT

Figure 6:
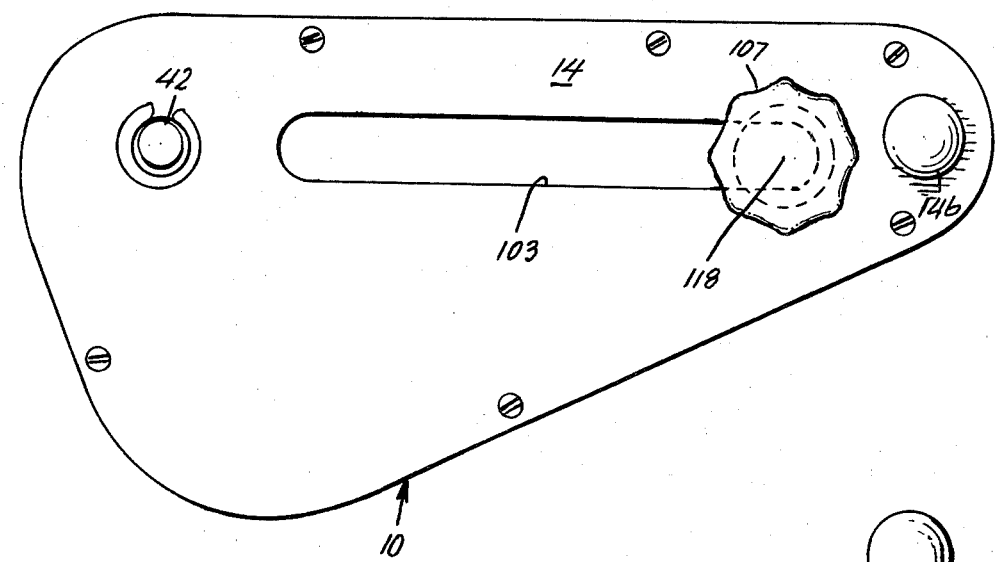
FIG. 6 is a top plan view of the device of this invention.
Figure 7:
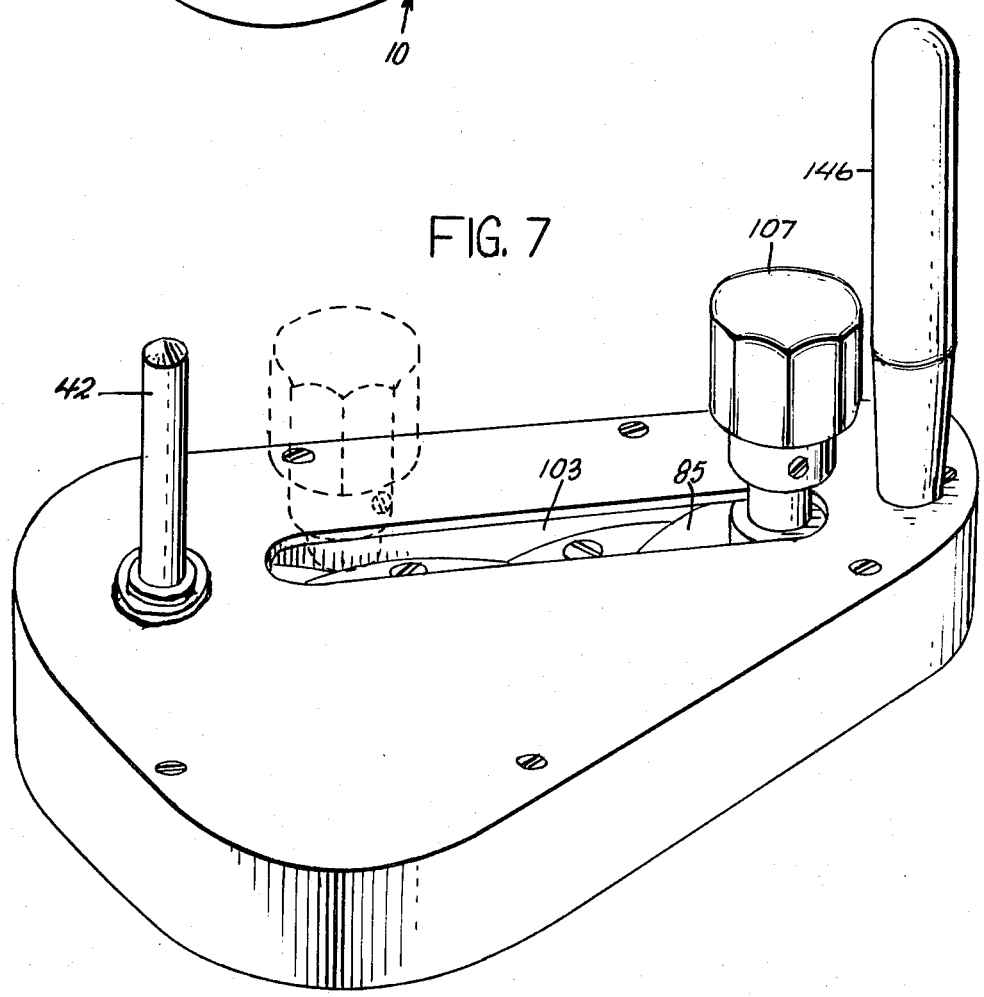
FIG. 7 is a perspective thereof.

Referring now to the drawings, there is shown in FIG. 1 a device in accordance with the present invention indicated generally at 10 which includes a housing 12 provided with a closure panel 14. An articulated gear train 16 having a plurality of sections 18, 20, 22 and 24 is received in the housing 12.

Housing 12 is of generally triangular configuration and has a bottom wall 26 and peripheral wall 28. A plurality of lobes as at 30 are provided in wall 28 and have formed therein threaded holes 32 in which are received threaded fasteners 33 which secure closure panel 14.

A circular hole 34 is formed though the bottom wall 26 adjacent one end 34 thereof. An elongated slot 38 is also formed through the bottom wall 26 generally parallel to portion 40 of peripheral wall 28 and generally in alignment with a radius of the hole 34.

A pilot drill 42 extends coaxially through the opening 34 with its shank portion 44 projecting upwardly (as viewed in FIG. 2) of the housing 12, drill 42 further including a cutting or drill portion 46 which is distal to shank 44 and a pilot portion 48 therebetween. A spur gear 50 is fixedly mounted to the shank 44 for rotation within the housing 12 and has a hub portion 52 which fits coaxially through the opening 34. Gear 50 is journalled in suitable bushings 54, 56 in and between a pair of generally parallel link plates 58, 60 of section 18. Plates 58, 60 are, in turn, fixedly secured in parallel, spaced-apart relationship by two bar-like spacers 62 and screws 64 (see FIG. 3). A first idler gear 66 is journalled between the ends of links 58, 60 and one end of a second pair of link plates 68, 70 of section 20 of elongated, generally eliptical configuration as best seen in FIG. 1 such that the gear 66 is operatively meshed with gear 50. The gears are coplanar and the end portions of the link plates 58, 60 are overlapped and interleaved with the end portions of the link plates 68, 70.

Gear 66 is rotatably received on an axle 71 which is received through openings 72, 74 in the link plates 70 and 60, respectively. The lower end of the axle 71 is provided with a flat 75 (see FIG. 2a) which interlockingly engages a complementary D-shaped opening in the link plate 70 to prevent rotation of the axle relative to link plate 70. The axle 71 is in turn secured by means of threaded fasteners as at 76 and a threaded fastener 77 and washer 79, fastener 76 passing through an opening in plate 58 and being coaxially threaded into the end of axle 71 and fastener 77 also passing through an opening in plate 68 and being threaded into the opposite end of axle 71. Plates 68, 70 are also secured together in parallel, spaced-apart relationship by spacers 62 and threaded fasteners 64 (FIG. 3). Thus configured, the link plates 68, 70 can pivot as a unit relative to the link plates 58, 60 about the axis of axle 71 and, simultaneously, gear 66 can rotate about the axle 71. In like manner, additional link assemblies 82, 84 and 83, 85 of sections 22 and 24, respectively, are coupled sequentially by means of axles 86, 88, there being gears 90, 92 rotatably received on axles 86, 88, respectively, each being operatively engaged with the adjacent gear. Axle 86 has a flat 75 on its lower end which mates with a D-shaped opening in link plate 70. Axle 88 has a flat 75 on the lower end also which mates with a D-shaped opening in link plate 83. As previously described, threaded fasteners pass through clearance openings in the outer plates to be threaded into the opposite ends of the respective axles.

The last, or distal link assembly 83, 85 has received therein an output gear 94 operatively engaged with gear 92 and having its hub portion 96 depending from housing 12 through elongated slot 38. Gear 94, and more particularly hub 96, is journalled for rotation in link assembly 83, 85 by means of bearings 98, 100. Bearing 100 is press-fitted into link plate 85 and includes a threaded stub 104 which extends upwardly through elongated slot 103 in closure panel 14 of the housing 12, this slot being parallel to and juxtaposed with respect to slot 38. Bearing 98 may be a ball or needle bearing assembly capable of taking side thrust. An adjustable clamping knob 107 has a threaded hole 109 received on the stub 104.

A suitable cutting tool, such as a milling cutter 111, more particularly a ball end mill, is received in and clamped to the hub 96 of gear 94 and secured by means such as a set screw 108.

It will now be seen that the link assemblies of sections 18, 20, 22 and 24 in conjunction with the gears 50, 66, 90, 92 and 94 form an articulated gear train pivotable about each of axes 110, 112, 114 and 116. This enables movement of axis 118 within slot 38, 103 to a selected spaced position with respect to the pilot drill axis 110. Correspondingly, this moves the cutting tool 111 to this selected position. The cutting tool is then secured in position relative to housing 12 by tightening the clamping knob 107 against plate 14. This movement is illustrated by the solid and dashed lines in FIG. 1, the housing being internally open as indicated by numeral 119 to accomodate movement of the links to the dashed-line positions.

In order to maintain the tool a fixed distance from and in parallelism with a workpiece in the form of a section 120 of sheet metal, an elongated stabilizing spacer 140 is secured to bottom 26 of housing 12 in parallelism therewith. Spacer 140 may be formed of sheet steel with an elongated flat section 136 and enlarged circular section 138 extending parallel to the flat surface of bottom 26. Depending brackets 142 on the sections 136 and 138 are secured as by welding to bottom 26 thereby rigidly mounting spacer 140.

In section 136 is formed an elongated slot 144 which extends parallel and in registry with slot 103 in cover plate 14 and slot 38 in bottom 26. This slot 144 is narrower than slot 38 and only slightly wider than the diameter of the cutter 111 to provide rotational clearance for the latter.

An upstanding handle 146 is secured to the cover plate 14 by any suitable means beyond knob 107 and preferably is rotatable about its axis.

In use, a pilot hole is cut or drilled into a sheet of metal or wood 120 (FIG. 2 only) by means of the pilot drill 46 chucked into an electric drill or drill press (not shown). The pilot portion 48 of the drill 46 is thus positioned within the drilled pilot hole 122. With the drill press turning drill 46, the cutting tool 111 is pressed downwardly through sheet 120 until spacer 140 engages sheet 120. The tool 110 is then moved sideways to cut a slot in sheet 120. With knob 107 tightened against cover plate 14, handle 146 may be grasped and forced sideways about axis 110 which causes cutter 111 to cut a circular slot in sheet 120 with axis 110 as the center. With the knob 107 loosened, handle 146 can be manipulated to cut a slot of desired configuration.

The stablizing spacer 140 is held flush against the sheet 120 so as to be slidable thereon while the handle 146 is being swung about axis 110. This stabilizes the tool during the cutting action of the cutter 111, especially since the sections 136 and 138 extend full length between pilot drill 46 and cutter 111. The handle 146 and its attachment to cover plate 14 should be sufficiently strong so as to provide the necessary leverage to cause cutter 111 to cut through the sheet 120.

Because of the operating characteristics of cutting tools such as disclosed, it is desirable that the cutting tool 111 operate at a higher rotating speed than the pilot drill 42. Accordingly, the diameters of the drive gear 50 relative to the remaining gears in the gear train is selected to give a speed multiplying ratio therebetween. In a specific embodiment, this ratio is selected to be 2:1 with gear 94 having eighteen teeth and gear 50 having thirty-six teeth. Idler gears 66, 90 and 92 have twenty-four teeth.

If it is desired to provide a tool with even a higher speed multiplication, the gear 66, etc. can be replaced with compound gearing as shown in FIG. 3. In this configuration, drive gear 50 engages a first idler gear 126 of smaller diameter. To gear 126 in turn is directly coupled a gear of larger diameter 128. These gears still rotate about a single axle (pivot axis) 112. Gear 128 subsequently engages the adjacent smaller diameter gear (not shown) of a second compound gear which has coupled thereto a gear of larger diameter, etc. It will thus be seen that substantial speed multiplication can be obtained.

The tool of this invention provides for improvement in cutting circular holes as opposed to the use of conventional fly cutters or hole saws. Further, this tool can be used with a hand held drill which is not possible with a fly cutter. The rate of cutting can be controlled by the lateral force applied by the operator to handle 146. Changing radius of a hole to be cut is simple and easy to accomplish as the only manipulations necessary are the loosening of knob 107, moving knob 107 and cutter 111 assembly within slots 103, 38, 144 until cutter 111 is centered at the radius of cut, and then tightening knob 107 against cover plate 14. The cutter 111 is thereby locked at the radius of the cut to be performed.

A further advantage resides in the ability to control the rate of cutting by means of operator applied force to handle 146 as opposed to cutting a hole by means of a fly cutter or hole saw which depends upon the rotating speed of the drill press which mounts the same. Also a portion of a hole may be cut. With knob 107 loosened, an irregular slot pattern may be cut, the operator grasping both the knob 107 and handle 146.

The adjustable radius for a cut depends upon the number and diameter of the gears. To maintain a clockwise direction of cutting, looking down toward the sheet 120, the gear progression must be an odd number, such as 1-3-5-7-9, etc. The design shown is a five gear model: the next larger size would employ seven gears.

While there have been described above the principles of this invention in connection with specific apparatus, it is to be clearly understood that this description is made only by way of example and not as a limitation to the scope of the invention.

What is claimed is:

1. A tool for cutting openings in a workpiece comprising: a housing; an articulated arm received in said housing, said arm having a proximal and distal end and a plurality of sections pivotable about spaced parallel axes, such that the distal one of said axes is movable between positions close to and distal from the proximal one of said axes; a plurality of gears journalled in said sections, each said gear being journalled for rotation about a predetermined one of said axes; and said gears being operatively meshed in series to form an articulated gear train; a pilot drill fixedly connected to the proximal one of said gears for rotation about the respective axis, said drill having a shank portion extending outwardly from said housing and being operatively engageable by a machine tool, said housing being manually rotatable about said drill; tool holding means fixedly connected to the distal one of said gears for rotation therewith about the distal one of said axes, whereby said pilot drill is drivingly coupled to said tool holding means; and clamping means for fixedly securing said distal section to said housing with said distal axis disposed at a selected spacing from said proximal axis.

2. The device of claim 1 wherein said clamping means includes an elongated slot formed in said housing, a threaded stud fixedly secured in said distal one of said sections and extending outwardly of said housing through said elongated slot, a threaded element received on said threaded stud, and a cutting tool secured to said tool holding means for rotation about said distal axis.

3. The device of claim 2 wherein said gears are spur gears, that one of said spur gears that is coupled to said pilot drill having a diameter greater than the others of said gears whereby the rotational speed of said tool holding means is greater than the rotational speed of said pilot drill.

4. The device of claim 3 wherein said housing is closed and includes an inner cavity dimensioned to accomodate movement of said sections therein.

5. The device of claim 4 wherein each said section comprises an upper and a lower plate fixedly secured together in parallel spaced-apart relationship, there being axles fixedly secured to said plates to extend therebetween, a gear rotatably mounted on each axle, each said section being pivotable about a respective one said axle.

6. The device of claim 2 wherein each said gear is a compound gear having an upper and a lower gear section of respectively different diameters, the smaller of each said gear engaging the larger of each said gear operatively preceding it in said gear train.

7. The device of claim 6 wherein said pilot drill includes a cutting portion and a smooth portion.

8. The device of claim 5 further including a guide means fixedly secured to said housing adjacent said pilot drill for slidably engaging a workpiece and stabilizing said device thereagainst while said housing is rotated about said drill.

9. The device of claim 1 wherein each section comprises two spaced apart plates, the plates of one section being interleaved with the plates of an adjacent section, axles coincident with said axes, respectively, interconnecting the plates of adjacent sections, said gears being mounted on said axles, respectively, said tool-holding means including a hub on said distal gear, and a milling cutter tool removably secured to said hub.

10. The device of claim 9 wherein said clamping means includes a threaded stud operatively secured to the distal one of said sections, and a knob element adjustably mounted on said stud to engage and lock selectively against said housing.

11. The device of claim 8 wherein said guide means includes an elongated flat element secured in spaced relation to said housing, said flat element lying in a plane normal to said axes and extending from the proximal axis to the distal axis, said flat element having a straight slot extending between said proximal and distal axes and receiving therethrough said pilot drill and cutting tool.

* * * * *